June 30, 1964 R. H. WISE Re. 25,606
MOTION-TRANSMITTING MECHANISM
Original Filed June 10, 1955
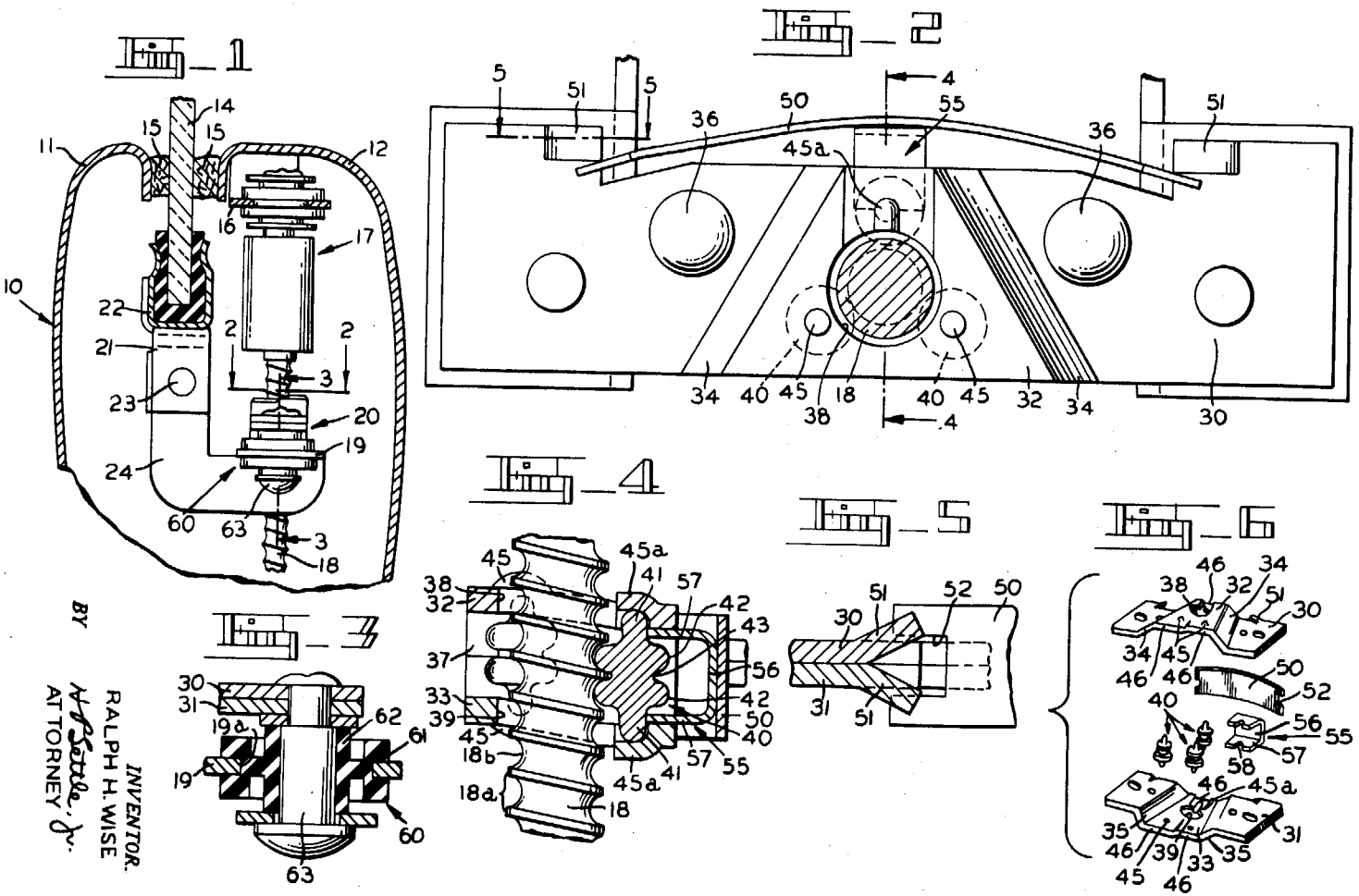
INVENTOR.
RALPH H. WISE
BY H. P. Settle, Jr.
ATTORNEY United States Patent Office Re. 25,606
Reissued June 30, 1964

25,606
MOTION-TRANSMITTING MECHANISM

Ralph H. Wise, Dyersburg, Tenn., assignor to The Anderson Company, a corporation of Indiana Original No. 3,006,631, dated Oct. 31, 1961, Ser. No. 761,753, Sept. 18, 1958, which is a continuation of Ser. No. 514,575, June 10, 1955. Application for reissue Aug. 20, 1962, Ser. No. 218,807
15 Claims. (Cl. 74—424.8)

Matter enclosed in heavy brackets [ ] appears in the original patent but forms no part of this reissue specification; matter printed in italics indicates the additions made by reissue.

The present invention relates to a motion-transmitting or motion-converting mechanism, and more particularly for a mechanism for converting rotational motion into linear motion or vice versa.

The present application is a continuation-in-part of my earlier filed application which issued on July 26, 1955, as Patent No. 2,714,005.

The present application is also a continuation of my copending application Serial No. 514,575, filed June 10, 1955, now abandoned.

In my earlier application, I have disclosed and claimed a motion-transmitting mechanism including a pair of relatively rotatable and relatively linearly movable elements, one of the elements being a threaded shaft and the other of the elements including a plurality of shaft-engaging members having toroidal surface-engaging portions which are in substantial point-to-point contact with the shaft, the shaft-engaging elements being carried or supported by a carrier for rotation about axis which are substantially parallel to the axis of the threaded shaft. Motion-transmitting mechanisms of this character are useful for a great many purposes, the device being commercially utilized in vehicular window regulator mechanisms for the power elevation and lowering of automobile windows. Other commercial uses include the elevation and lowering of vehicular radio antennae or the like.

The present invention constitutes an improvement upon and further refinement in the device which is fully disclosed and claimed in my earlier filed copending application, now Patent No. 2,714,005. Specifically, this improvement resides in the provision of means biasing at least one of the shaft-engaging elements into intimate surface contact with the threaded shaft. Of course, it will be appreciated that the term "shaft" is used generically in the following description of the invention, to include within its scope a threaded element of the type disclosed in my pending application Serial No. 503,891, filed April 26, 1955, which issued on February 23, 1960, as Patent No. 2,926,351, wherein the actuated member comprises a cable having wrapped thereabout a wire or the like which provides a helically threaded exterior peripheral surface.

More specifically, the improvement of the present invention preferably includes an inherently resilient biasing means mounted upon and reacting against the carrier of the motion-transmitting mechanism to thrust one of the thread-engaging elements toward the threaded shaft. Preferably, a pressure-transmitting saddle or the like is interposed between the biasing means and the thread-engaging element to transmit the biasing force to a plurality of spaced points on the thread-engaging member to insure proper alignment of the thread-engaging element and the shaft.

It is, therefore, an important object of the present invention to provide a motion-transmitting mechanism which is extremely simple and inexpensive in construction and operation and which may be effectively utilized as a portion of a mechanism for converting rotary motion to linear motion or vice versa.

Another important object of the present invention is to provide an improved motion-converting mechanism including a plurality of thread-engaging elements retained by a carrier for rotation about individual axes, at least one of the elements being urged toward thread-engagement by biasing means reacting against the carrier.

It is a further important object of the present invention to provide an improved motion-converting mechanism wherein an inherently resilient biasing element is utilized to urge one of a plurality of thread-engaging elements into thread-engagement, the biasing element acting through a pressure-distributing member for distributing the biasing pressure proportionately to various parts of the thread-engaging element.

Yet a further important object is the provision of an improved mechanism for converting rotary motion to linear motion, or vice versa, wherein a carrier is provided to retain a plurality of thread-engaging elements in intimate engagement with a threaded shaft or the like, one of the elements being resiliently urged into engagement with the threaded shaft, and the carrier being supported for movement relative to the threaded shaft so that the carrier is movable to retain the shaft centrally of the thread-engaging elements despite wear of the elements or distortion of the shaft.

Other and further important objects of the present invention will become apparent from a study of the detailed description of the invention as hereinafter set forth and an inspection of the appended drawings.

On the drawings:

FIGURE 1 is a fragmentary sectional view, with parts shown in elevation, of a vehicular window-lift mechanism provided with a motion-transmitting mechanism of the present invention;

FIGURE 2 is a sectional view taken along the plane 2—2 of FIGURE 1;

FIGURE 3 is an enlarged fragmentary sectional view taken along the plane 3—3 of FIGURE 1;

FIGURE 4 is an enlarged fragmentary sectional view taken along the plane 4—4 of FIGURE 2;

FIGURE 5 is a fragmentary sectional view taken along the plane 5—5 of FIGURE 2; and FIGURE 6 is an exploded view, illustrating in perspective the motion-transmitting mechanism of FIGURES 1–5.

As shown on the drawings:

In FIGURE 1, reference numeral 10 refers generally to a vehicular body component, such as a door having an inner door panel 11 and an outer door panel 12. The outer door panel 12 cooperates with the inner panel 11 to guide therebetween a vertically movable window 14.

The window 14 is engaged on opposite sides by weather strips or the like 15 carried by the panels 11 and 12. The outer door panel 12 is provided with an inwardly directed flange 16 which carries a bearing, indicated generally at 17, journalling the upper end of a rotatable, exteriorly, threaded drive shaft 18. A medial portion of the threaded shaft 18 is encompassed by a motion-transmitting mechanism 20 of the present invention which is disposed on a pair of flanges 19 forming an operative part of a window-actuating structure, including the window 14, an upper hanger bracket 21 secured to the supporting channel 22 of the window 14, and a lower hanger unit 24 which directly carries the mechanism 20 upon the outturned flanges 19. The upper hanger unit 21 and the lower hanger unit 24 are pivotally joined as at 23. Obviously, upon rotation of the threaded shaft 18, the motion-transmitting or converting mechanism 20 will travel vertically along the shaft to elevate and lower the window 14 to close or open a ventilation opening provided in the body component 10.

As perhaps best illustrated in FIGURES 2 and 4, the motion-transmitting or converting mechanism 20 includes a carrier defined by a pair of superimposed, generally planar plates 30 and 31. Each plate is provided with a central, generally vertically displaced portions 32 and 33, respectively, joined to the remainder of the plate by inclined joining portions 34 and 35. The plates are secured together by a suitable means, as by rivets 36 so that the offset portion 32 and 33 are superimposed and cooperate to define between the plates and interior recess 37 (FIGURE 4). It will be seen from an inspection of FIGURES 2 and 4 that the recess 37 is located centrally of the plates and is of substantial vertical dimension. The plate 30 is provided with an aperture 38 located centrally of its relatively elevated central portion 32, and the plate 31 is provided with a similar aperture 39 located centrally of its relatively depressed central portion 33. The apertures 38 and 39 are in registry and are adapted to receive therethrough the threaded shaft 18, as is well illustrated in FIGURES 2 and 4.

Within the recess and grouped peripherally about the axis of the shaft 18 are a plurality of individual thread-engaging elements 40. These thread-engaging elements are perhaps best illustrated in FIGURES 4 and 6, while the circumferential spacing of the same may be best seen in FIGURE 2. With reference particularly to FIGURE 4 of the drawings, it will be seen that the thread-engaging elements 40 are rotatable about individual vertical axes defined by extended axle ends 41 which terminate in smoothly convex outer portions which are adapted to abut the plates 30 and 31 in a manner to be hereinafter more fully described. Intermediate the axle extremities 41 of the elements 40, the elements are provided with a pair of axially spaced, generally toroidal thread-engaging surfaces 42 which are joined by a generally concave, reduced diameter portion 43. The thread 18 is preferably of the rolled type having radially enlarged thread crests 18a and concave portions 18b joining the thread crests. The toroidal portions 42 of the elements 40 are of an axial extent less than the intercrest dimension of the threaded shaft 18 so that the convex exterior surfaces of the toroidal portions 42 abut the concave joining portions 18b of the shaft thread. The reduced diameter or concave portions 43 are of such a diameter that clearance between the toroidal portions 42 is provided for the thread crests 18a, while the toroidal portions 42 abut the adjacent concave portions 18b on either side of a given crest. It will be appreciated that a radial section of either of the toroidal portions 42 of a given element 40 would be circular in configuration, while a section taken parallel to the axis of rotation of the elements 40 and at the thread-engaging portions of either of the toroidal portions 42 would be smoothly elliptical in contour.

The thread-engaging elements 40 are supported in the carrier by abutment of the pintle or axle portions 41 of the elements 40 with the plates. To retain the elements 40 in position, the offset portions 32, 33 of the plates 30, 31 are provided with dimples 45 snugly receiving the convex pintle portions. One of the dimples, designated 45a in FIGURES 2, 4 and 6, is elongate toward the axis of the threaded shaft 18, so that this one thread-engaging element 40 may move radially with respect to the thread toward and away from the thread axis. The other two rotatable elements are snugly received within their dimples 45 which serve to retain the two rotatable elements opposing the movable element against either axial or radial movement. The elongate dimples 45a accommodate only radial movement of the associated element 40, while snugly retaining the element against axial displacement. Further, it will be noted from FIGURES 4 and 6 that the offset portions 32, 33 of the plates are further slightly offset, as at 46, so that the rotatable elements 40 will be properly disposed axially of the shaft 18 for proper engagement with the threads of the shaft. In other words, the rotatable elements 40 are disposed in different planes spaced axially of the shaft so that snug and proper engagement between the rotatable elements and the threaded shaft is assured.

As best shown in FIGURES 2, 4 and 6, the rotatable thread-engaging element which is disposed in the elongate dimples 45a is resiliently urged toward the axis of the threaded shaft in order to, first, insure snug engagement between the shaft and the rotatable elements, second, compensate for any wear which may occur upon either the shaft or the thread-engaging elements 40, third, aid in accommodating any functional misalignment of the shaft 18 and the rotatable elements, as might occur during commercial manufacture of a body panel, such as the door panel 10, and fourth, reduce noise by insuring snug shaft-element contact.

This means for resiliently urging the one rotatable element 40 toward the shaft includes an inherently resilient leaf spring 50 which is carried by the carrier and which exerts a resilient biasing effect in a plane radial to the shaft 18. More particularly, the leaf spring element 50 is retained on the carrier by tangs 51 which are struck from the planar outer portions of the plates 30 and 31 to extend generally vertically therefrom as illustrated in FIGURE 5. The ends of the leaf spring 50 are notched, as at 52 (FIGURE 5) to receive the plates 30, 31 therebetween with the portions of the spring 50 defining the notch abutting the tangs 51.

A pressure-distributing means 55 is interposed between the leaf spring 50 and the rotatable thread-engaging element 40 disposed in the elongate dimples 45a, this pressure-distributing means being in the form of a saddle having a bight portion 56 which is in extended surface engagement with the inner surface of the leaf spring 50 and vertically spaced leg portions 57 extending radially of the shaft 18 into abutment with the pintle or axle portion 41 of the one rotatable element 40. The inner extremities of the legs 57 are notched, as at 58, to prevent relative lateral movement between the saddle 55 and the adjacent rotatable element 40.

It will be understood that the biasing element 50 exerts a biasing force in a plane radial to the shaft 18, this biasing force being transmitted and distributed by the saddle 55 to the axle or pintle ends of the rotatable element so that a uniform pressure is distributed to the rotatable element. This retention of the biasing element 50 by the tangs 51 formed integrally with the carrier plates 30, 31 insures the ready assembly of the elements, and the positive locking of both the saddle 55 and the biasing element 50 in position by virtue of the inherent resiliency of the biasing element.

As illustrated in FIGURE 3, the plates 30, 31 are attached to the flanges 19 through a pair of elastomeric bushings 60. Only one of the bushings is shown and it is provided with a circumferential groove 61 receiving a flange 19 therein and disposing a bushing within a flange aperture 19a. The central cylindrical portion 62 of each bushing is centrally apertured to receive therethrough an elongate rivet 63 which serves to secure the plates 30 and 31 to the bushings. Thus, the carrier or the retaining member of the motion-transmitting mechanism 20 is secured to the flange 19 carried by the window 14 in such a manner as to be capable of relative movement by distortion of the bushings 60.

The operation of the device hereinbefore described will be readily appreciated by those skilled in the art. However, in order to facilitate an understanding of the present invention, and in order that those skilled in the art may better understand its application and uses, a short description of the operation will be given.

The shaft 18 is adapted to be rotated by a suitable means, either manually by an occupant of the vehicle, or by an electric motor as has been suggested in my earlier filed applications. Upon rotation of the shaft 18, the thread-engaging elements 40, being in engagement with the threads of the shaft 18, will cause movement of the carrier plates 30, 31 and the window 14 carried thereby, the direction of movement deepnding upon the direction of rotation of the shaft 18.

The commercial utility of a motion-converting mechanism, such as that illustrated in the drawing, has been well demonstrated by the subjection of a motion-converting mechanism of this type to an endurance test wherein the device was still in proper commercial operating order after having been actuated through more than thirty thousand cycles, each cycle representing a complete raising and a complete lowering of the window 14. However, during such use, some wear of the shaft and of the rotatable elements 40 may occur.

The resilient biasing element 50 and the saddle 55 are provided primarily in order to accommodate such wear without destroying the effectiveness of the motion-transmitting qualities of the present invention. The resilient urging of the one element 40 into intimate engagement with the thread will compensate for any dimensional changes because of wear. Further, the saddle 55 acts to urge both the top and the bottom pintle portions of the element 40 toward the axis of the shaft 18, so that the element is always rotating about an axis substantially parallel to the axis of the shaft.

If any substantial misalignment of the shaft with respect to the elements 40 should occur, either because of wear, cocking of the shaft during operation, or assembly inaccuracies, the resilient bushings 60 may distort sufficiently to restore alignment. In this connection, it will be seen that the biasing member 50 exerts a considerable force upon the one element 40 which is mounted for radial movement in the elongate dimples 45a. At the same time, because of the elongate contact between the biasing means 50 and the saddle 55, this effect is always exerted in a direction normal to the shaft. The biasing effect of the spring 50 will restore the carrier to its normal position with some distortion of the resilient bushings 60 occurring to accommodate such movement of the carrier.

From the foregoing detailed description, it will be appreciated that the present invention provides a new and novel motion-transmitting and/or motion-converting mechanism whereby rotary motion is converted into linear motion, or linear motion may be converted into rotary motion in a manner which maintains alignment between a plurality of thread-engaging elements and a threaded element regardless of wear of the relatively movable elements of the mechanism and regardless of any slight inaccuracies or misalignment problems which may arise during mass production of items, such as automobile body panels, in which the mechanism is utilized.

It will, of course, be understood that various details of construction may be varied through a wide range without departing from the principles of this invention, and it is, therefore, not the purpose to limit the patent granted hereon otherwise than necessitated by the scope of the appended claims.

I claim:

1. In a window regulator for a window movable into and out of a vehicular body component and actuatable by a nut assembly carried by the window for travel along a rotatable threaded shaft, the improvements in said nut assembly which comprise a carrier mounted on the window, a plurality of rotatable shaft-engaging elements journalled by said carrier, one of said elements also being movable relative to said carrier in a plane radial to said shaft, and spring means carried by said carrier and engaging said one element to bias the same in said radial plane toward the shaft.

2. In a window regulator for use with a window actuatable to open and close a ventilation opening in a vehicular body component, said window being actuatable by the travel of a nut assembly along a rotatable threaded shaft, said nut assembly including a plurality of thread-engaging elements surrounding a portion of said shaft and held in assembled relation by a carrier, at least one of said elements being movable, the improvements of a spring on said carrier exerting a biasing force toward said shaft, and a bridging member interposed between said spring and said movable element to transmit the biasing force of said spring to said one element, whereby said one element is urged into intimate contact with said thread.

3. In a device of the class described and including a rotatable shaft, a plurality of shaft-engaging elements each having a toroidal surface portion adapted for substantially point-to-point contact with the shaft and trunnions on either side of said toroidal portion, a supporting assembly journalling said elements for rotation about said trunnions at least one of said elements being radially movable relative to the shaft, spring means bottomed against said supporting assembly and capable of exerting a substantial biasing force, and a force-distributing means operatively interposed between said spring means and said movable element to substantially equally distribute the biasing force of said spring means to the trunnions of said one element, whereby said one element is biased by said spring means in a direction to intimately engage said shaft.

4. A device for converting rotary motion to longitudinal motion comprising driving and driven members, one of said members having an exterior helical thread of appreciable axial lead and the other of said members including a carrier embracing a portion of said thread, means resiliently supporting said carrier, a plurality of thread-engaging elements mounted on said carrier for rotation about axes substantially parallel to the longitudinal axis of said one member generally and in symmetrically spaced relation to said longitudinal axis, said elements lying in different radial planes of said one member in spaced relation along the axis thereof to insure accurate engagement of said elements with the thread, at least one of said elements being movable relative to said threaded member, and means on the carrier resiliently urging said movable element toward said one member, the resilient carrier supporting means accommodating movement of the carrier to retain said one member centrally of said elements.

5. In a device of the class described, driving and driven members disposed for relative rotational and longitudinal movement, one of said members having a periphery forming a helical thread, the other of said members comprising a carrier encompassing a portion of said thread, a plurality of thread-engaging elements retained by said carrier and freely rotatable relative thereto about separate axes respectively substantially parallel to the axis of said one member, at least one of said elements being movable relative to the threaded member, and spring means anchored to said carrier and thrusting against said movable thread-engaging element to urge said one element against said one member.

6. In a device of the class described, driving and driven members disposed for relative rotational and linear movement, one of said members having a periphery forming a helical thread and the other of said members comprising a carrier provided with a medial aperture through which said one member freely extends, a plurality of thread-engaging elements retained by said carrier for free rotation, said elements being grouped peripherally about said aperture and each having a plurality of thread-engaging exterior surface portions overhanging said aperture, the thread-engaging portions of each of said elements being toroidal in exterior contour and being axially spaced from one another by a concave surface portion, said concave portion being of an axial extent sufficient to bridge the crown of said thread in close-fitting but normally noncontacting relation thereto, the convex exterior contour of said thread-engaging portions of each of said elements engaging the thread on either side of the crown thereof, said elements each having an axial extension at each extremity thereof terminating in a bearing surface engaging the carrier to support said element for rotation, at least one of said elements being movable relative to the threaded member, a spring anchored on said carrier, and a saddle having leg portions engaging the axial extensions of said movable element and a bight portion operatively engaged by said spring to urge said one element against the thread.

7. In a device for converting rotary motion to longitudinal motion by the cooperation of driving and driven members, one of which is threaded and the other of which is in engagement with the thread, the members being relatively axially and rotationally movable, a thread-engaging element forming an operative part of said other member and having axially spaced toroidal exterior thread-engageable surfaces and a concave surface therebetween, said element having an axial extension at each extremity thereof forming trunnions concentric with said toroidal and concave surfaces, said extensions terminating in bearing surfaces adapted to support said elements against axial displacement, means on said other member for movably mounting said element relative to the threaded member, and spring means operatively engaging said trunnions.

8. A load-bearing assembly comprising a pair of generally rectangular planar plates, means for securing said plates together, said plates having opposed portions oppositely offset with respect to the planes of the plates to define a pocket therebetween, seats formed in the portions of said plates defining said pocket, rollers positioned in the pocket and having terminal axle portions engaging the seats, said plates having openings between the rollers for receiving a shaft having a peripheral portion adapted to engage the rollers, one of said rollers having its axle portions loosely engaging its seat so that said roller is adapted for movement radially of the shaft, and spring means bottomed against one of said plates and acting on the axle portions of said one roller for urging the same radially.

9. In a device for converting rotary motion into linear motion and including relatively rotatable and longitudinally movable members, one of which has a peripheral helical thread of appreciable lead, the other of said members comprising a thread-engaging element, means supporting said element for rotation about an axis generally parallel to the axis of said thread, said element having a plurality of axially spaced, generally toroidal thrust-transmitting surfaces of smoothly convex outer contour, adjacent surfaces being separated by an angularly concave portion intermediate said surfaces, said surfaces being engageable with said thread in thrust-bearing relation thereto, said concave surface being normally spaced from the crown portions of said thread in close-running relation thereto, said element being mounted on said other member for radial movement relative to the threaded member, and spring means acting on said element at a location remote from said toroidal surfaces to bias said element into intimate contact with said thread.

10. A device for converting rotary motion to longitudinal motion, comprising driving and driven members, one of said members having an exterior helical thread of appreciable axial lead and the other of said members including a carrier embracing a portion of said thread, a plurality of thread-engaging elements mounted on said carrier, said elements being mounted substantially symmetrically about said one member and having toroidal exterior surfaces extending radially of said elements into substantially point-to-point engagement with the thread thereof, means on said carrier supporting said elements for rotation about an axis parallel to the longitudinal axis of said one member, one of said elements being loosely supported on the carrier for relative movement radially of said one member, and spring means retained by said carrier in thrust relation to said one of said elements and effective to urge said one element radially into engagement with said thread.

11. A load-bearing assembly for use with a rotatable shaft comprising a pair of support members formed with relatively offset portions providing a pocket therebetween, said offset portions being provided with integral seats, shaft-engaging elements disposed in said pocket and having axle portions rotatably engaging the seats, spaced means connecting the members at locations apart from the pockets, the members having openings communicating with the pocket between the elements for receiving the shaft adapted to be engaged by said elements, a leaf spring having end portions retained by said support members on either side of said pocket and a medial portion bridging said pocket, and a pressure-distributing yoke interposed between said spring and one of said elements to transmit the biasing force of said spring to said one of said elements, whereby said one element is resiliently urged toward said shaft.

12. In a window regulator of the type having a power-rotatable threaded shaft engageable by a nut assembly movable relative to said shaft to actuate a vehicle window into and out of a vehicular body opening, the improvements which comprise a carrier forming a part of said nut assembly, a plurality of individual thread-engaging elements journalled by said carrier for rotation about separate axes, one of said elements being bodily shiftable radially of its axis toward the axis of rotation of said shaft, said carrier being apertured for receiving said threaded shaft therethrough with said elements being engageable therewith, means confined between the carrier and said one element for shifting said one element to compensate for wear during operation of the regulator, and distortable means for mounting said carrier on the window, so that said carrier is movable bodily relative to the threaded shaft to maintain the thread-engaging elements in proper relation to the shaft despite shifting movement of said one element.

*13. In a screw drive, a screw spindle, three rollers arranged parallel to said screw spindle and provided each with a series of circular ridges entering the helical groove formed by the thread on said screw spindle, means for rotatably supporting said rollers in the position in which said circular ridges engage the thread of said spindle whereby upon rotation of said screw spindle a relative axial displacement takes place between said screw spindle and said rollers, and means for urging at least one of said rollers in radial direction yieldably in engagement with said screw spindle.*

*14. In a screw drive, a screw spindle, two spaced and parallel bearing plates provided with axially aligned bores through which said screw spindle extends with both its ends, at least two rollers provided with a series of circular grooves arranged parallel to said screw spindle and engaging with their circular ridges formed by said grooves the thread of said spindle, trunnions on both ends of said two rollers and rotatably supported in said bearing plates, and means for yieldably urging at least one of said rollers in radial direction in engagement with said screw spindle.*

*15. In a screw drive, a screw spindle, two spaced and parellel bearing plates provided with axially aligned bores through which said screw spindle extends with both its ends, three rollers provided with a series of circular grooves arranged parallel to said screw spindle and engaging with their circular ridges formed by said grooves the thread of said spindle, trunnions on both ends of said two rollers and rotatably supported in said bearing plates, and springs engaging at least one of said rollers for urging the same radially in engagement with said spindle.*

References Cited in the file of this patent or the original patent

| | | |
|---|---|---|
| 1,827,968 | Bryant | Oct. 20, 1931 |
| 2,714,005 | Wise | July 26, 1955 |